D. FISKE.
FISH STRINGER.
APPLICATION FILED FEB. 28, 1921.
1,423,203.
Patented July 18, 1922.
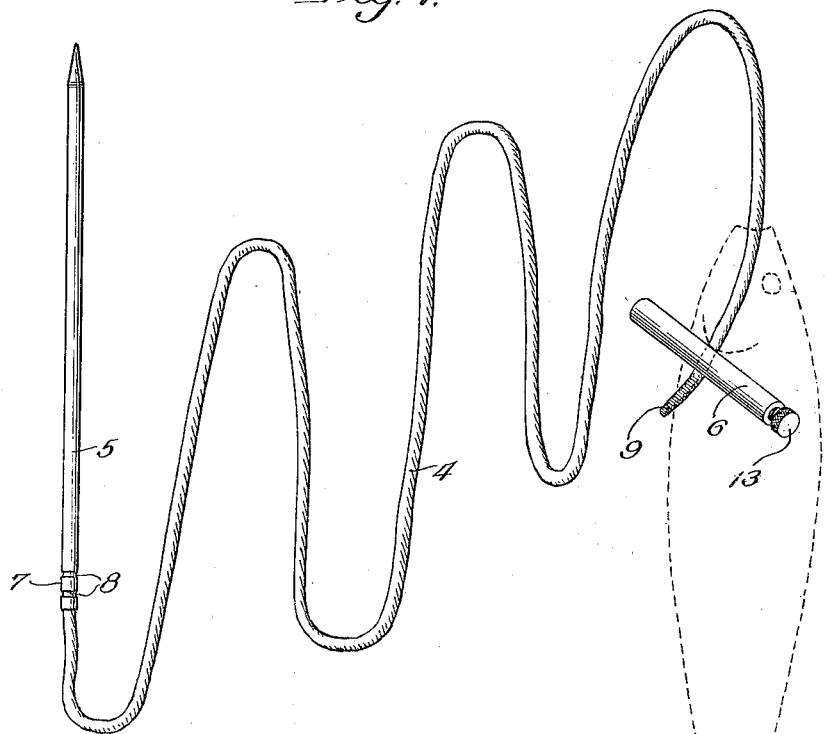
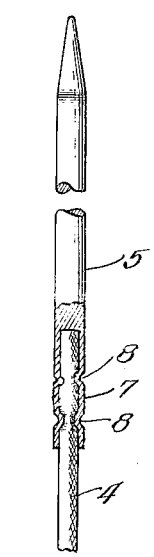
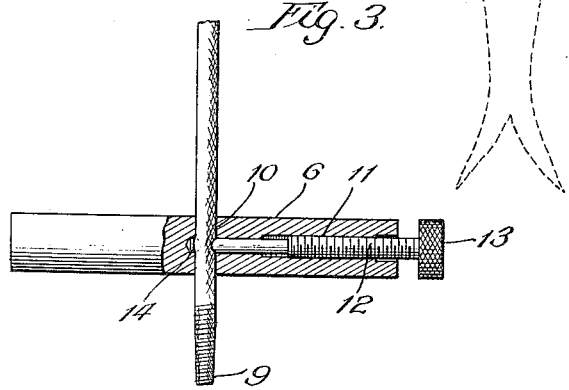
Inventor:
David Fiske
By: Wm. O. Bell Atty.

UNITED STATES PATENT OFFICE.

DAVID FISKE, OF CHICAGO, ILLINOIS.

FISH STRINGER.

1,423,203.

Specification of Letters Patent. Patented July 18, 1922.

Application filed February 28, 1921. Serial No. 448,722.

*To all whom it may concern:*

Be it known that I, DAVID FISKE, a citizen of the United States, residing at Chicago, in the county of Cook and State of Illinois, have invented certain new and useful Improvements in Fish Stringers, of which the following is a specification.

The object of this invention is to provide a fish stringer which will not only hold the fish thereon securely but from which the fish may be easily removed.

And a further object of the invention is to provide a fish stringer with an adjustable and removable cross bar so that said bar can be adjustable to any position along the string or removed entirely from the string to permit the fish to drop off of the string.

In the accompanying drawings illustrating a selected embodiment of the invention Fig. 1 shows the stringer with a fish indicated in broken lines.

Fig. 2 is a detail sectional view showing one way of affixing the needle to the string.

Fig. 3 is a detail sectional view showing the construction of the cross piece.

Referring to the drawings, the invention comprises a string 4 of any suitable length having on one end thereof a needle 5 and on or about its other end a cross bar 6. The needle is preferably provided at its inner end with a socket 7 to receive the end of the string 4 and the needle may be secured to the string in any suitable manner as by compressing or corrugating the socket end of the needle as indicated at 8, Fig. 2. The other end 9 of the string may be bound or otherwise fixed so that it will not fray and always pass freely through a transverse opening 10 in the cross bar 6. This cross bar is preferably made of metal and it is provided with a longitudinal bore 11 which is preferably threaded throughout a portion of its length and may be threaded throughout its entire length. A bolt 12 threadedly engages the bore its inner end being arranged to project into the opening 10 while its outer end has a knurled head 13 by which the bolt is operated. It will be readily understood that the bolt is loosened to thread the string through the opening 10 to adjust the cross bar on the string after which the bolt is screwed into engagement with the string to secure the cross bar in its adjusted position. I may also recess the cross bar at 14 on the opposite side of the opening 10 from the bore 11 so that the bolt may push the string into the recess when it is screwed tightly in place and thus provide a more secure locking of the cross bar on the string. This may be desirable for stringers for large fish but it may not be necessary for stringers for small fish.

With the ordinary fish stringer provided with a permanently attached cross bar it is necessary to pull the string through the fish or to push each fish off of the string at the needle end thereof, and the difficulty of each of these operations is known to all fishermen.

My invention provides a simple means whereby all the fish are permitted to drop off of the string by reason of their own weight without any difficulty when the cross bar is detached from the string. It will be perfectly apparent that when it is desired to remove fish from the stringer the bolt is loosened so that the cross bar will slide freely off of the stringer or so that it can be easily removed from the stringer whereupon all of the fish will slide off of the end 9 of the stringer when the latter is held upright; or the stringer can be pulled through the fish without difficulty.

The invention is embodied in a simple form in the drawings but it is susceptible of various modifications and I reserve the right to make all such changes therein as fall within the scope of the following claim.

I claim:

A fish stringer comprising a flexible string, a cross bar having a transverse opening extending therethrough, and a socket extending longitudinally of the bar and connecting with said transverse opening and a bolt threadedly engaging said longitudinal socket and adapted to impinge against said string to detachably secure the cross bar on the string, said flexible string capable of being moved in opposite directions through the transverse opening.

DAVID FISKE.